H. A. MAYER.
CULTIVATOR.
APPLICATION FILED NOV. 29, 1919.

1,402,242.

Patented Jan. 3, 1922.
6 SHEETS—SHEET 6.

H. A. Mayer,
INVENTOR,

BY
ATTORNEY

UNITED STATES PATENT OFFICE.

HENRY A. MAYER, OF YORKTOWN, TEXAS, ASSIGNOR OF ONE-HALF TO BEN H. JANSSEN, OF YORKTOWN, TEXAS.

CULTIVATOR.

1,402,242.   Specification of Letters Patent.   Patented Jan. 3, 1922.

Application filed November 29, 1919. Serial No. 341,424.

*To all whom it may concern:*

Be it known that I, HENRY A. MAYER, a citizen of the United States, residing at Yorktown, in the county of De Witt and State of Texas, have invented a new and useful Cultivator, of which the following is a specification.

This invention relates to cultivators, and especially to riding cultivators in which provision is made for turning the wheels to guide the machine.

The primary object of the invention is to provide a new and superior type of cultivator which when the wheels are guided by the rider pressing down upon suitable foot pedals or stirrups, the shovel gangs are shifted in the direction toward which the wheels are inclined, the gangs being maintained at all times in positions parallel with the line of draft, or with the longitudinal axis of the machine.

A further object is to provide a means for resiliently holding the shovel gangs into the soil, so that the depth of cultivation may be as uniform as possible when operating on uneven ground, or when working in different kinds of soil.

A further object is to provide a mechanism for raising and lowering the shovel gangs so that the gangs are always horizontal in any adjusted position, this mechanism cooperating with the means for resiliently holding the shovel gangs, so that when any shovel strikes an obstruction, the gangs will rise against the resistance of the said resilient means and will slide or pass over the obstruction, whatever their adjusted position may be.

Another object is to provide a readily operated means for adjusting the distance between two shovel gangs, while maintaining each gang in its usual horizontal position, parallel to the other.

An additional object is to provide clamping means on the gang beams, whereby the shovels may be adjusted at any height, on either side, and at any longitudinal position with respect to the beams.

The preferred means by which I have accomplished the several objects stated are illustrated in the accompanying drawings and are hereinafter specifically described; but I wish it understood that changes in the form, size, material, proportion and minor details of construction, may be made within the scope of the appended claims.

The reference numeral 15 in the drawings designates a tongue. A frame substantially U-shaped is secured to the tongue 15. The frame is made up of horizontal bars 16 having inturned portions 17 and forwardly extending hounds 18. Braces 19 strengthen the corners of the frame. The tongue is preferably clamped between the hounds 18. The free ends of the bars 16 support a seat 20 in any desirable position. The frame and tongue lie in the same plane, forming a rigid structure, as Figure 1 discloses. A doubletree 21 may be pivoted to the tongue where joined to the frame.

To the outside of each bar 16 of the frame, at the corners of the latter, is secured a plate 22. These plates have depending portions 23 provided with bores near their lower extremities to receive the protruding ends 24 of a guide bar 25, which lies between the plates and forms a rigid structure with the frame proper. The guide bar 25 is rectangular in cross section, and when properly secured between the plates 22, lies with its broad face or side in a plane inclined to the vertical, as seen best in Figure 3, for a purpose to be described. Each plate 22 has an upstanding portion or projection 27 terminating in a collar 28.

Figure 3:
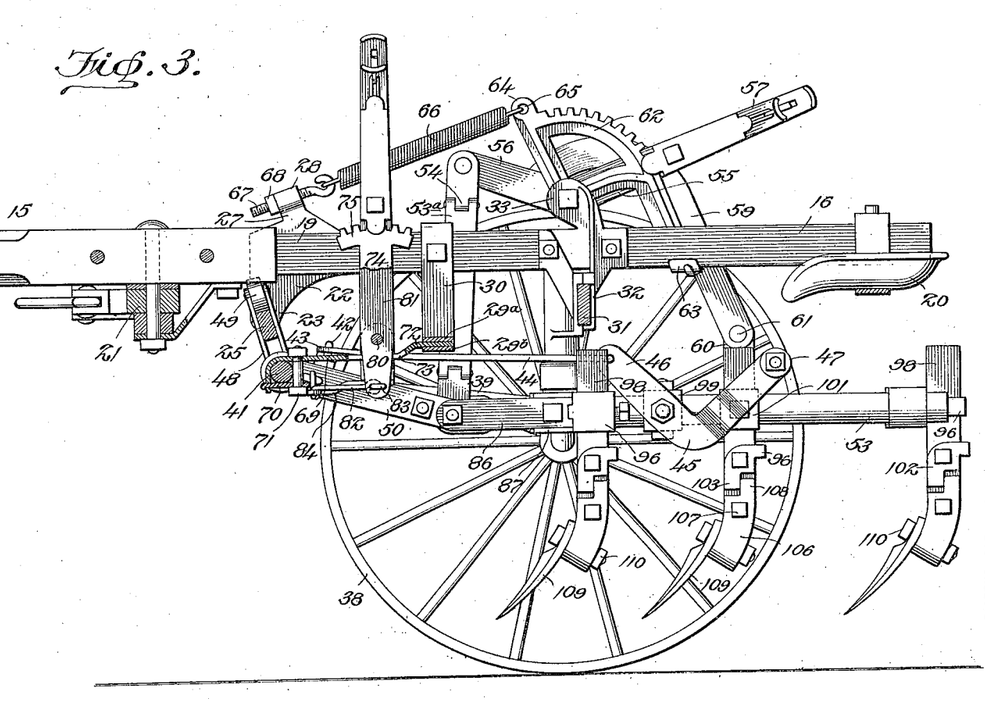
Figure 3 is a longitudinal sectional view, the line of section being substantially that of 3—3 in Figure 2, the machine being shown with the gang beams raised, and the wheel unguided.

A cross bar 29 with upwardly extending arms 30 is bolted to the longitudinal bars 16 at the upper ends of arms 30. The cross bar 29 lies in a horizontal position, and the arms 30 in vertical positions. The chief function of this cross bar is to support certain movable parts of the cultivator. For this purpose it is preferably bi-sectional, as seen in Figure 3, comprising the upper and lower sections 29ª and 29ᵇ.

A transverse beam 31 is secured to the bars 16 beneath the same by suitable depending brackets 32. The beam 31 thus forms a part of the frame and extends on either side beyond the bars 16, as seen in Figure 2, to provide supports for wheels. This beam performs the function of an axle beam for the machine. The brackets 32 have upwardly extending ears 33, 34, (see Figures 1, 3 and 16) the ear 34 lying on the outside of bar 16 and ear 33 lying inside. The function of these ears is to provide a rigid support for certain parts of the gang lifting mechanism to be described. The ears 33, 34, are secured to bars 16 in any suitable way.

Each end of the transverse beam 31 has a bracket 35 fixed upon it. Each bracket 35 is formed with a depending vertical tubular section or bearing 36. Journaled within each vertical bearing is a vertical spindle 37. Each spindle is a continuation of an axle, said axles having the usual supporting wheels 38.

All the parts so far described, except the wheels and their pivotal axles, are immovable with respect to each other and constitute a frame or support for the movable parts of the machine which will now be described.

The first parts to be considered are the mechanisms for turning the wheels to guide the machine and for shifting the shovel gangs as the wheels are guided. Since the mechanism for any one wheel and shovel gang is exactly like the mechanism to turn the other wheel and gang, only one mechanism will be described.

As Figures 1 and 2 best show, the spindle 37 has a lever 39 clamped to it below the tubular section or bearing 36. Lever 39 when turned moves the spindle within its bearing, and turns the wheel. The lever 39 extends forwardly of the machine and upwardly, and is pivotally connected to a clamp 40 surrounding a supporting cross rod 41, which extends entirely across the machine. Thus rod 41 and lever 39 are hingedly connected to each other. A link 42 is pivotally secured at one end to clamp 40 preferably by the same securing means holding lever 39. The other end of link 42 is pivotally secured to an elbow lever 43 at the angle of said lever. The elbow lever is in turn pivotally secured at one end to the cross bar 29 to turn about that end. The other end of the elbow lever 43 is pivotally connected to a link 44 at one end of the latter. The link 44 extends rearwardly and is pivotally secured to the upwardly-extending arm 46 of a foot-operated bell crank lever 45, swingably mounted on the gang beam, and having a treadle 47 for the foot of the operator who sits in the seat 20 at the rear of the machine. As the mechanism is duplicated for each gang, it will be understood that one treadle is on the right side of the seat, while the other is on the left side.

Figure 4:
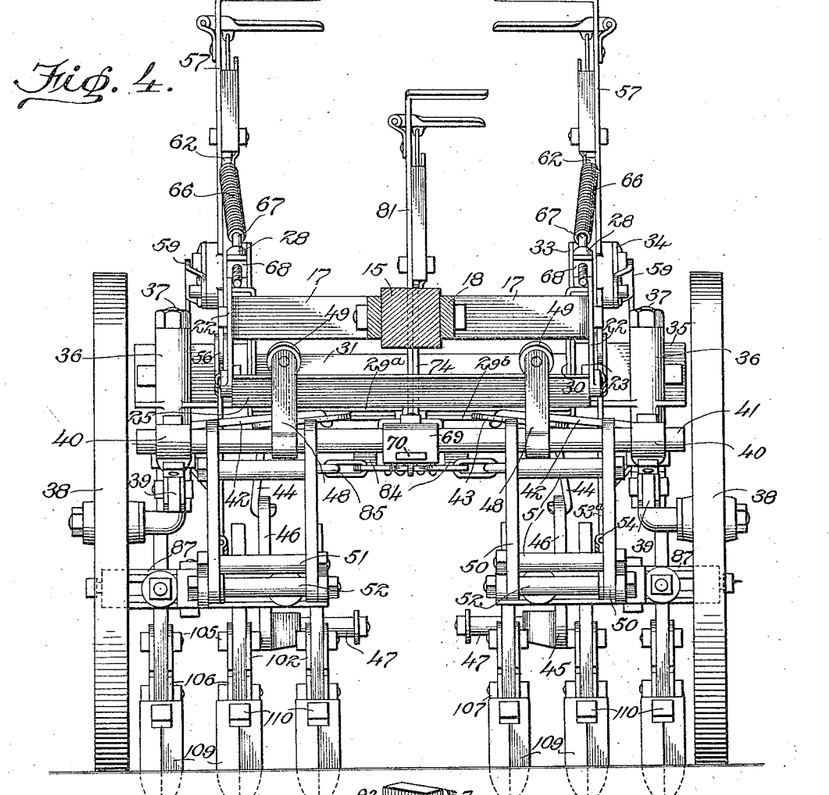
Figure 4 is a transverse sectional view, taken on the line 4—4 of Figure 2, and looking in the direction indicated, but showing the wheels in their straight ahead position.

Secured to the cross rod 41 at convenient points are a pair of straps 48. (See Figs. 2 and 4). The straps enclose the cross rod and extend above the same on each side of the guide bar 25. Rollers 49 are mounted between the upper ends of the straps so as to turn freely. The rollers are designed to run upon the upper edge of the guide bar 25, which serves as a track for the rollers. The straps and rollers together constitute hangers for the cross rod, which thus is movable parallel to the guide bar, beneath the same.

The cross rod 41 being secured to each lever 39, forms a parallel link or parallel-motion mechanism, and hence when the above-described parts are manipulated to turn one wheel, the other wheel turns with it an equal degree, so that at all times both wheels are parallel to each other as Figure 2 shows. The cross rod 41 also serves as the supporting axis for the shovel gangs, as will now be explained.

Figures 12, 13, 14, 15, 16:
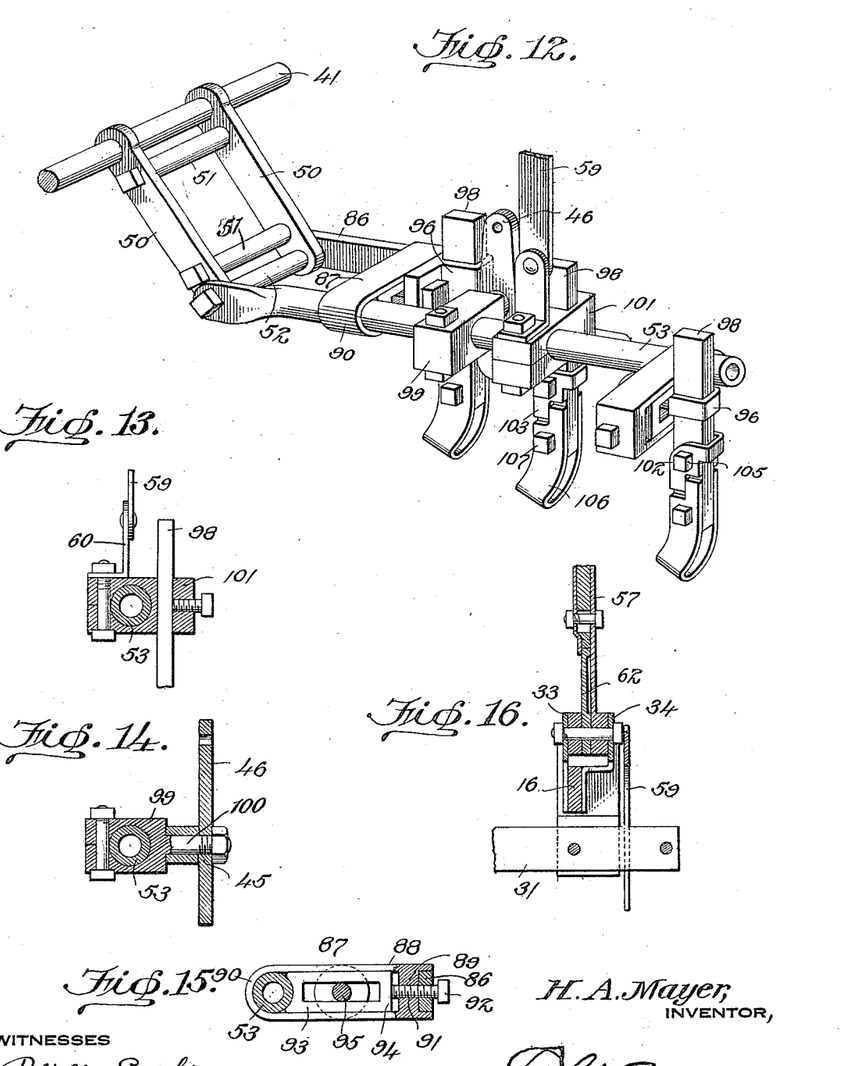
Figure 12 is a perspective view of one of the shovel gangs removed from the machine.
Figure 13 is a transverse section taken through the clamp which holds the second, or intermediate plow standard to the beam.
Figure 14 is a transverse section taken through the clamp which connects the foot treadle to the beam.
Figure 15 is a transverse section taken through the clamp for the front or forward plow standard.
Figure 16 is a detail sectional view on an enlarged scale of the hand lever, rack and adjacent parts which are used in adjusting the elevation of the shovel gang.

On each side of the longitudinal axis of the machine, a shovel gang is pivotally mounted upon the cross rod so as to swing vertically (see Fig. 12). Each shovel gang includes an inclined hanger frame formed of longitudinal bars 50 and cross bars 51 which extend between and space apart the bars 50 at points short of their ends. This hanger frame is secured at the upper ends of bars 50 to cross-rod 41 so that it may not only swing vertically, but may slide along the cross rod 41, as will appear, holes being provided in the upper ends of bars 50 to receive said rod. At the lower ends of bars 50 a bar 52 pivotally connects the hanger frame with the gang beam 53 and its attendant parts to be presently described.

Figure 1:
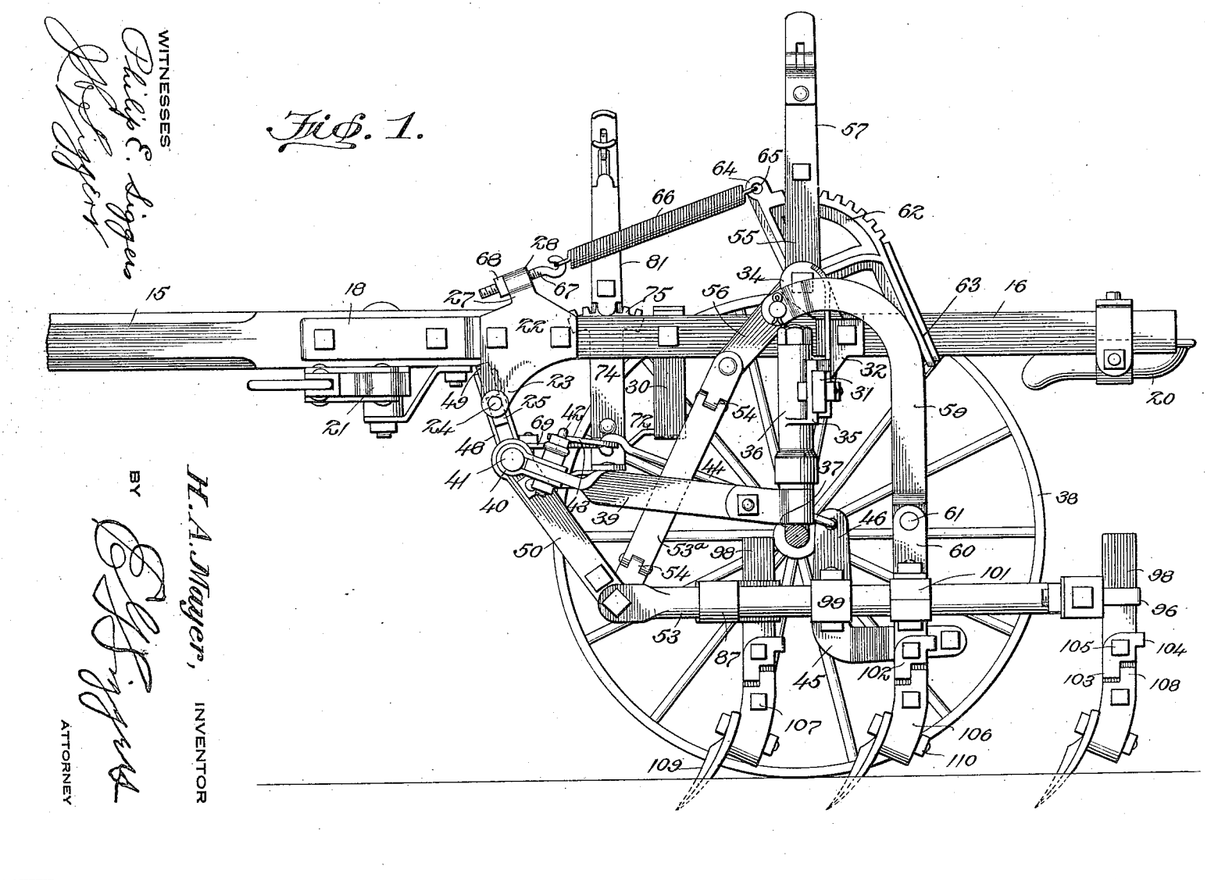
Figure 1 is a side elevation of a two-row cultivator embodying the improvements which form the invention, showing it in working position.
Figure 2:
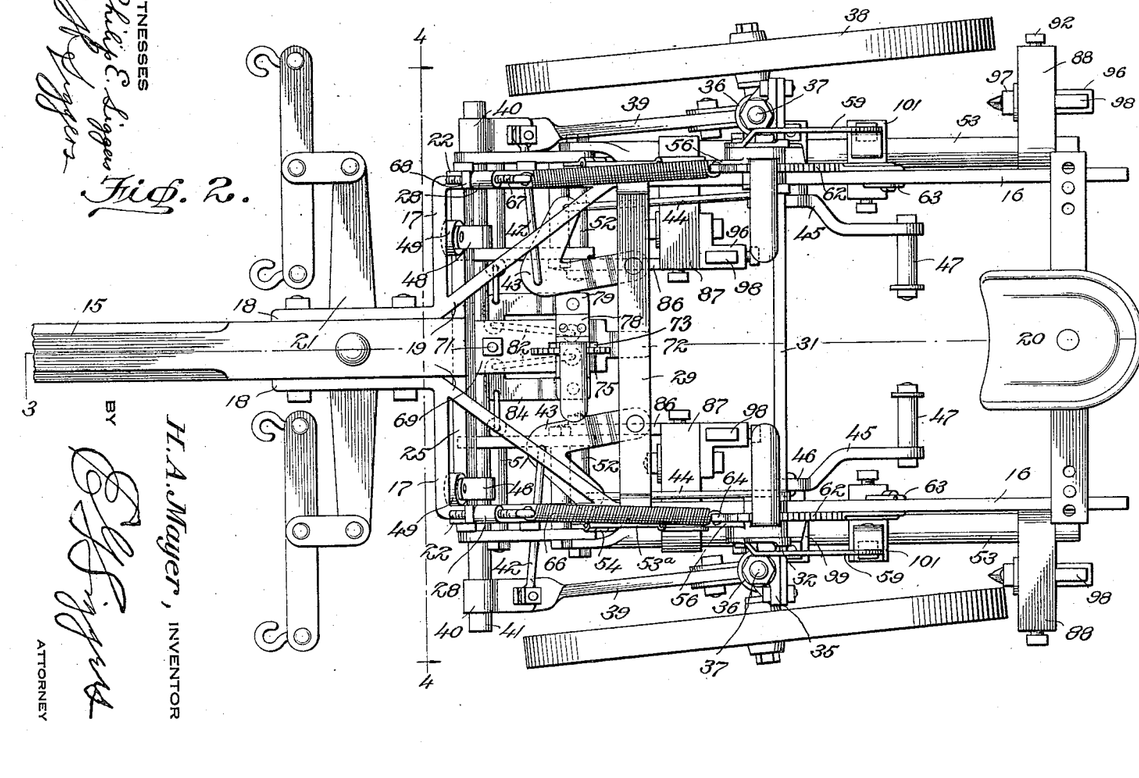
Figure 2 is a top plan view of the machine, showing the wheels in a guided position.

The cross bar 52 also carries a three-part link 53ª, having hinges 54 intermediate its ends (Figure 1). The link 53ª extends upwardly and in an inclined direction outside of and close to the main frame, and is pivoted at its upper end to a bell crank hand lever 55, comprising a short arm 56 and a long arm 57. The hand lever 55 is pivoted upon a bolt or rivet secured between the upper ends of the ears 33, 34. Between the ends of the short arm 56 of the hand lever is pivoted a curved link 59, so that the latter may swing vertically. The lower end of the curved link 59 is pivoted as at 61 to a short standard 60 fixed by any desirable means to the gang beam 53 and extending vertically therefrom. A segmental rack 62 is pivoted between the ears 33, 34. The hand lever has its long arm 57 so fashioned that it may be adjusted in any position along the rack and held locked in the familiar way. One end of the rack is extended downwardly and has a U-shaped hook arm 63 catching under the bar 16 by which the rack is held from turning on its pivot in one direction. At the other end of the rack an ear 64 is provided, with a hole 65. A coiled spring 66 is fastened to the rack by means passed through the hole in the ear. The other end of the coiled spring is secured to an eye bolt 67, or the like, which in turn is passed through the collar 28 of plate 22 and held within the collar by a nut 68.

It will be clear that by turning the nut 68, the tension of the coiled spring 66 will be adjusted. The spring normally holds the rack firmly in the position shown in Figures 1 and 3, with the hook arm 63 preventing turning of the rack under the influence of the coiled spring. The weight of the shovel gang, acting through links 59 and 52, both of which are attached to the short arm 56 of the hand lever, serves to additionally hold the rack, when the hand lever is locked upon the latter. The hand lever when moved over the rack will raise or lower the shovel gang. The two hand levers 57 independently control the gangs.

Figure 10:
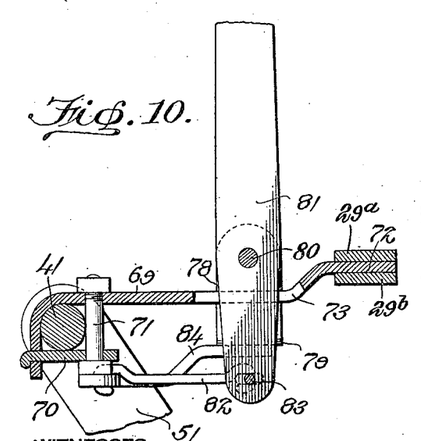
Figure 10 is a longitudinal section on the line 10—10 of Figure 8.
Figure 11:
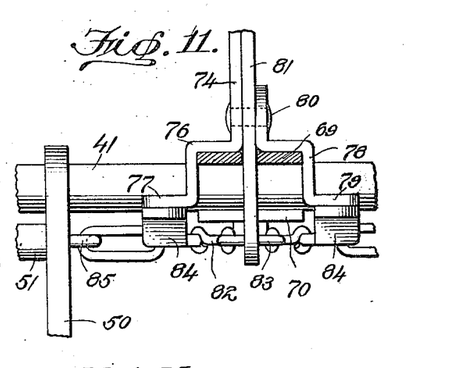
Figure 11 is a detail in elevation looking from the rear of the machine showing a part of the same mechanism.

The means by which the shovel gangs are adjusted toward and from each other will now be described. At a central point on the cross rod 41 a plate 69 is clamped as by a rolled section with an interlocking strap 70 and bolts 71 (Figs. 2, 3 and 10). The plate 69 is secured at its other end to the cross bar 29 by a tongue 72. Intermediate its secured ends the plate is provided with a longitudinal slot 73. A standard 74 is fixed upon the plate at one side of the slot. The standard 74 carries an arcuate rack 75 at its upper end, and at its lower end is bent into a stepped section 76 terminating in an outwardly extending foot 77 lying well below the level of the plate (see Figure 11). A complementary member 78 having a stepped section and a foot 79 is made fast to the plate on the other side of the slot. A fastening element 80 holds the member 78 and standard 74 together, and provides an axis upon which a hand lever 81 may swing. The upper end of the hand lever locks in the well-known manner by a hand-operated pawl with the rack 75. The lower end of the lever 81 extends through the slot in the plate and below feet 77, 79.

A pair of links 82 are pivotally secured by any desirable means, as a double eye bolt 83 to the lower end of hand lever 81 (Figs. 8, 9, 10, 11). The other ends of the links 82 are pivoted to levers 84. The levers 84 at the ends remote from their connection with links 82, are pivoted to the feet 77, 79, so as to swing horizontally. The levers 84 are flexibly connected to eyes 85, which form a part of the uppermost cross bars 51 of the hanger frames and which extend from the inner ones of the bars 50. It will be evident, from the foregoing, that when the levers 84 are swung on their pivots, by moving the levers 81 forwardly or backwardly, the hanger frames will slide back and forth on the cross rod 41.

The shovel gangs remain to be described in detail. But one will be mentioned, since they are exactly alike. The gang comprises a gang beam, a number of clamps secured upon the gang beam, plow standards and feet held in adjusted positions by the clamps, and shovels fastened to the feet. The construction of the feet is considered to be an important part of my invention.

Figures 5, 6:
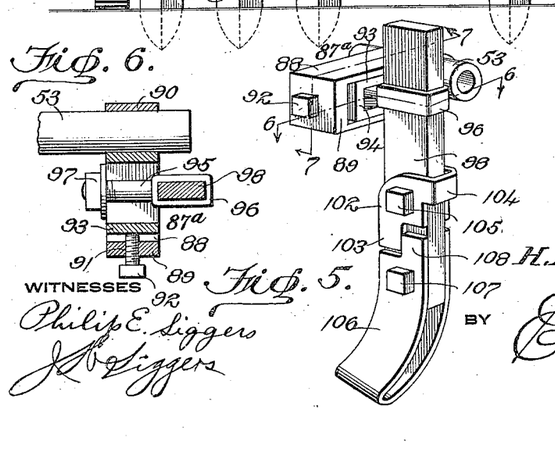
Figure 5 is a perspective detail view of the means for adjustably attaching the rear shovel standard to the gang beam and for permitting the shovel to give when an unyielding obstruction is encountered.
Figure 6 is a section on the line 6—6 of Figure 5, looking downwardly, and omitting distant parts.
Figure 7:
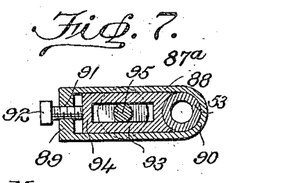
Figure 7 is a section on the line 7—7 of Figure 5, looking in the indicated direction.
Figure 8:
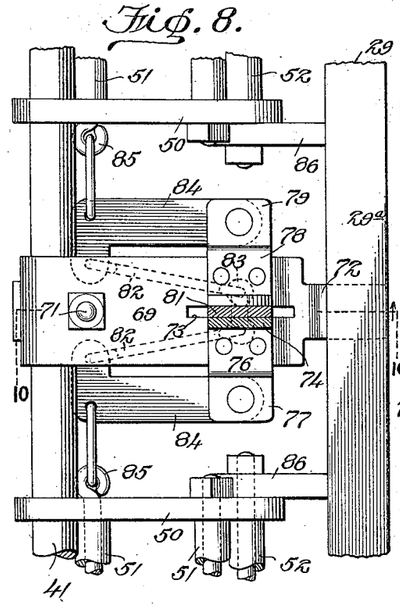
Figure 8 is a detail in plan of a part of the mechanism which shifts the shovel gangs toward or from each other, looking from above.
Figure 9:
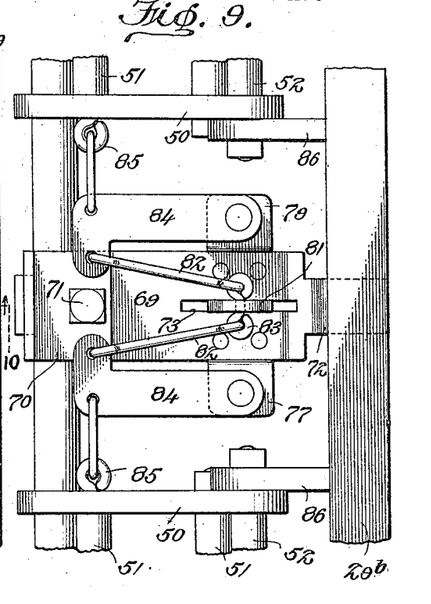
Figure 9 is a detail in plan, looking from underneath the machine, of the gang mechanism.

Pivoted to the hanger frame and secured to the gang beam is an offset bar 86 (see Figs. 2 and 12). A clamp 87 is made fast to and connects the gang beam and offset bar (see Fig. 15). A similar clamp 87ª, shown in Figs. 5, 6 and 7, is employed at the rear end of the gang beam and a description of one will suffice for both. The only difference between the clamps 87 and 87ª is that the latter is united to the offset bar 86 as well as to the gang beam, while the former is secured only to the gang beam. The clamps 87 and 87ª comprise an elongated casing 88 having a squared end 89 with an opening adapted to fit over the gang beam. The squared end 89 has a threaded bore 91 adapted to receive an adjusting screw 92. The casing 88 is hollow and receives a box-like gripping member 93 which is also hollow, having but four sides. The member 93 is flat at one end 94 against which the screw 92 bears; but its other end is concaved to bear against the gang beam. Obviously when the screw 92 is turned, the clamp grips the gang beam between the member 93 and the rounded end 90.

The box-like gripping member receives a bolt 95 having a hollow rectangular head 96 and a tightening nut 97 at the other end. The width of the head 96 is such that it is received by the hollow gripping member 93. The foot which carries one of the shovels has a standard 98 fitting within the head 96. The arrangement is such that when nut 97 is tightened, the standard 98 is clamped against the sides of casing 88 and gripping member 93. It will be plain that by the means just described, a shovel may be held either inside or outside the shovel beam, either forward or to the rear on said beam in a high or low position with respect to the beam, and forward or back of the clamp which holds it to the beam, as well as in several positions transversely of the cultivator along said clamp. In all said positions the standard 98 will be vertical.

The gang beam also carries a two-part block 99, which may be clamped thereto at any convenient point. The block 99 carries a pivot element 100 upon which the foot operated bell crank lever 45 is swingably mounted near its angle. (See Figs. 3 and 12.) Obviously, the block 99 when moved will shift the position of the treadle 47 and will take up any slack there may be in the mechanism which guides the machine.

The cultivator of the illustrated type employs three shovels to a gang, but there may be a fewer or greater number used. In the case of three shovels, two of the standards will be clamped by the described means 87 and 87ª. Preferably, though not necessarily, the middle standard will be held upon the gang beam by an ordinary two-part clamp, as shown in Figures 1, 2, and 13 designated by 101, but not described in detail because so well known. The standard 60 is preferably secured upon the clamp 101, rather than directly to the gang beam, so that there may be a slight adjustment possible between the curved link 59 and the gang beam.

Referring now to Figure 5, it will be seen that the standard 98 carries intermediate its ends, but nearer the lower end than the upper, a yoke 102, with a depending tongue 103 on either side of the standard, and a stop bar 104 connecting the two arms of the yoke.

A bolt 105 secures the yoke upon the standard in such a way that it is turned upon the bolt as an axis only when subjected to considerable stress. A foot 106 embraces the lower end of the shank, and is secured to the latter by a bolt 107, that tightly clamps it and permits the foot to turn only when a strong force is encountered. The upper ends of the foot have tongues 108 which are complementary to tongues 103 and lie adjacent thereto. The shovels 109 are fixed to the feet by any desirable means, as bolts 110.

The manner in which the various parts are used when the cultivator is at work will now be described.

When the operator desires to steer the cultivator, he presses his foot down on that treadle 47 lying on the side toward which the machine is to be guided. This action will pull link 44 rearwardly, which in turn will swing the elbow lever 43 in an outward direction. This outward swinging will force the link 42 outwardly; and since the link 42 is secured through clamp 40 to the cross rod 41, the cross rod will move in the same direction. The movement of the cross rod will carry with it both levers 39, which on their part turn the spindles 37 and hence the axles and wheels. At the same time, both the shovel gangs move horizontally with the cross rod 41, being always parallel with the longitudinal axis of the machine, however. The wheels, as has been noted, are always parallel to each other.

In any guided movement of the wheels, the rollers 49 which run along the guide bar 25 aid materially in the ease of operation, since they support the shiftable cross rod 41.

If it be desired to adjust the distance between the shovel gangs, the operator will shift the position of the hand lever 81 upon the rack 75. Pulling the lever 81 rearwardly will force the lower end of that lever forwardly, which will force the links 82 forwardly and the levers 84 outwardly in a horizontal plane. The levers 84 will shift the hanger frames and with them the shovel gangs proper outwardly or apart from each other. A push on the lever 81 in the forward direction will obviously shift the shovel gangs closer together. The shovel gang shifting mechanism, it will be clear, moves with the cross rod when the latter is moved as in steering; this mechanism also holds the two gangs together in any adjusted position, preventing movement of the gangs in either direction along the cross rod.

The manner in which the separate gangs are lifted, both by the operator and when an obstruction is encountered will be explained. When the farmer pulls down upon the hand lever 55, the hinged link 53 and the curved link 59 which are pivoted to the short arm 56 of the hand lever are raised, and being secured to the shovel gang, the latter is raised also. The rack 62 permits the hand lever and hence the shovel gang to be raised and secured in any adjusted position. However, there is a peculiarity in the present machine in that after a shovel gang is adjusted, it may be raised by an obstruction and also it will be held into the soil with resilient force. When an obstruction is met with, such as a large rock, or when passing over bumpy ground, the gang will give way, if the resistance is sufficient to overcome the weight of the gang and to expand the coiled spring 66.

When a gang is raised by any such means, the curved link 59 acts upon the short arm 56 of the hand lever 55 to move the arm upwardly. Since the hand lever is locked upon its rack, the latter will move in the same clockwise direction looking from the outside of the machine. But, as any movement of the rack in such direction is resisted by the coiled spring, it results that any movement of the gang is resisted by the spring, as well as by the weight of the gang, which it will be remembered swings about the cross rod as an axis. This raising of the gang in response to great resistance will take place in any adjusted position of the gang except the extreme upper position, when it is well clear of the ground and could not meet with any obstruction. When the operator desires to set the shovels into the soil, he moves the hand levers 55 forwardly, thus lowering the gangs, and locks the levers on their racks when the shovels are digging to the right depth.

The feet which hold the shovels are designed to furnish an additional safeguard against breakage of any parts when an underground rock, root or the like catches a shovel. In such a case, if the gang does not lift in time, and if the draft is great enough, the foot 106 will be swung rearwardly against the resistance of its bolt, whereupon its tongue 108 will be swung forwardly and will engage with the tongue 103 of the yoke 102. This engagement will swing the yoke against the resistance of its clamping bolt, perhaps until the stop 104 strikes the shank 98. Thus the shovel and attendant parts will never be broken, but will give way to dangerous strains, whereupon the operator can easily set the shovel in its digging position again, as shown in Figure 1.

While the invention is shown embodied in a two-row cultivator, it is obvious that it is capable of adaptation to a single-row cultivator.

What is claimed is:

1. In a cultivator, a main frame, a transverse rod, a guide bar, means connecting the rod with the guide bar to permit the former to move laterally, wheels, means for mounting the wheels to cause them to turn on vertical axes, means connecting the ends of the rod with the wheel mounting means to effect the simultaneous turning of the wheels upon movement of the rod laterally, hanger frames pivotally and slidably connected with said rod, shovel gangs pivotally connected with said hanger frames, means for shifting the hanger frames laterally along said rod without affecting the turning of said wheels to cause the lateral shifting of said gangs, and means mounted upon the gangs and having connection with said rod to move the rod laterally and turn the wheels at the same time.

2. In a cultivator having a frame and wheels, a transverse rod secured thereto, a guide bar set at an angle with respect to a vertical plane and in advance of and above while in parallel relation to said rod, straps secured to the rod and extended upwardly on either side of the guide bar, rollers mounted between the straps and riding upon the guide bar, and means connecting the rod with the wheels whereby the wheels may be turned about vertical axes with the rollers running over the guide bar as on a track.

3. In a cultivator, a transverse rod, a hanger frame swingably and slidably mounted on the rod, a shovel gang pivoted upon the hanger frame so as to move therewith when the frame is swung or slid, and raising means engaging with the pivot between the hanger frame and gang and also with the gang alone whereby the latter may be raised and held in horizontal planes in adjusted positions relative to the ground.

4. In a cultivator, a main frame, a transverse rod secured thereto, a hanger frame swingably and slidably mounted on the rod, a shovel gang pivoted upon the hanger frame so as to move therewith when the frome is swung or slid, links engaging with the frame and with the gang to hold the latter in adjusted positions relative to the ground and in horizontal planes, a swingable rack mounted on the main frame, a lock lever associated with the rack a spring tending to move the rack in one direction, and a stop on the rack and engaging with the frame to prevent such movement, said spring expanding to resist raising of the shovel gangs by obstructions.

5. In a cultivator having a frame, and a shovel gang adjustably mounted thereon, a rack mounted on the frame, a hand lever cooperating with the rack and connected with the shovel gang, said connections including a link pivotally connected to the rack and to the gang and a hinged link also pivotally connected to the same elements, the swinging of said hand lever raising the gang into positions at all times parallel to the ground.

6. In a cultivator, a main frame, a transverse rod secured thereto, a hanger frame swingably and slidably mounted on said transverse rod, a shovel gang swingably secured to the end of the hanger frame remote from the pivoted end, a rack mounted on the frame, a hand lever cooperating with the rack and connected with the shovel gang, said connections including a link pivotally connected to the rack and to the gang and a hinged link also pivotally connected to the same elements, the swinging of said hand lever raising the gang into positions at all times parallel to the ground.

7. In a cultivator having a frame, and a shovel gang pivotally mounted thereon, means for maintaining the shovel gang at all times parallel to the ground, said means including a rack pivotally mounted on the frame, a spring urging said rack to swing about its pivot, a stop member provided upon the rack and engaging with the frame to prevent movement in said direction beyond a certain point, a bell crank hand lever pivotally mounted at its angle upon the pivot of the rack and having means whereby it may be adjusted along the rack, the short arm of said lever being pivotally connected at its outer end with a hinged link, the other end of said hinged link being connected with the forward end of the shovel gang, and a second link pivoted to said short arm and also pivotally connected with the shovel gang at a point remote from the aforementioned connection.

8. In a cultivator having a frame and a shovel gang adjustably mounted thereon, means for raising and lowering said shovel gang with respect to the ground while maintaining it parallel to the ground at all times, said means including a hanger frame pivoted to the main frame to the forward end of the shovel gang, a rack mounted on the main frame, a bell crank hand lever including a long arm carrying means for engaging with the rack to hold the same in adjusted positions and a short arm, a doubly hinged link pivotally connected to the outer end of said short arm and likewise mounted upon the pivotal connection between the hanger frame and the shovel gang, and a second link pivotally secured to the shovel gang and to said short arm, the last-mentioned connection being between the pivot of the bell crank lever and the outer end of the short arm thereof but nearer the pivot of the bell crank lever.

9. In a cultivator, a frame, axles and wheels, means for mounting said axles to cause the wheels to turn on vertical axes, a parallel-motion mechanism connecting the axles to cause them to move in unison, means for mounting said mechanism on said frame, said mechanism comprising a transverse rod and pivoted levers at the ends of said rod, shovel gangs mounted on said rod, elbow levers pivoted upon said frame, a foot operated lever pivotally mounted on each shovel gang, and connections between said foot-operated levers and the elbow levers and between said elbow levers and the parallel-motion mechanism to operate the latter and turn the wheels by pressure upon either of said foot-operated levers.

10. In a cultivator, a frame, axles and wheels, means for mounting said axles to cause the wheels to turn on vertical axes, a parallel-motion mechanism connecting the axles to cause them to move in unison, means for mounting said mechanism on said frame, said mechanism comprising a transverse rod, and pivoted levers at the ends of said rod, shovel gangs mounted on said rod, a foot-operated lever pivotally mounted upon each gang at the inner side thereof, and connections between said levers and the parallel-motion mechanism to operate the latter and turn the wheels by pressure upon either of said foot-operated levers.

11. In a cultivator, a frame, axles and wheels mounted on the frame and provided with pivots, a cross rod movable transversely of and guided by the frame, shovel gangs pivoted about the cross rod, levers connected to the axles and pivotally connected with the cross rod at either end thereof, links pivotally connected with the levers and extending inwardly of the machine, elbow levers pivoted upon the frame and pivotally connected with the links, rearwardly extending links pivotally secured to the elbow levers, and foot-operated bell crank levers pivoted upon the shovel gangs and connected with said rearwardlly extending links.

12. In a cultivator, a frame, axles and wheels mounted on the frame and provided with pivots, a cross rod movable transversely of and guided by the frame, shovel gangs mounted upon the cross rod to swing vertically, means for guiding the wheels and shifting the cross rod along with its shovel gangs, said means including levers pivoted upon clamps, said clamps being secured to the shovel gangs and adjustable longitudinally thereof.

13. In a cultivator, a frame, a cross rod mounted in said frame, a shovel gang consisting of a beam carrying the shovels and a normally inclined hanger frame at the front end of the beam, means for pivotally connecting the hanger frame to the beam, said hanger frame being pivotally and slidably mounted on the cross rod, and lifting mechanism mounted on the frame and connected with the shovel gang, whereby the beam is maintained in a horizontal position throughout its vertical movement.

14. In a cultivator, a frame, a cross rod, hanger frames pivotally and slidably mounted upon said rod, a shovel gang pivotally connected with each hanger frame, a hand lever having locking mechanism, a pair of levers having connection with said shovel gangs, and means for connecting said levers to the hand lever whereby the movement of the hand lever in a vertical plane causes the shifting of the shovel gangs toward or from each other.

15. In a cultivator, a frame, a cross rod mounted upon the frame, hanger frames shiftable along the cross rod, gang beams pivoted to the hanger frames, a plate secured to the cross rod and also supported by the frame, a rack secured to the plate, a hand lever pivoted upon the plate and engaging with the rack, links flexibly secured to the hand beam, levers pivoted to the plate to swing horizontally and connected at one end to the links, and flexible connections between the levers and the hanger frames, whereby movement of the hand lever shifts said hanger frames along the cross rod and locking of the hand lever locks the hanger frames.

16. In a cultivator, a frame, a rack pivoted upon the frame, a spring urging the rack to swing about its pivot, means on the rack normally engaging with the frame and prohibiting swinging of the rack in the direction urged by the spring, a shovel gang swingably mounted on the frame, and lifting means for the shovel gang engaging with the rack whereby when the lifting means is locked by the rack any upward movement of the gang will take place against the force of the spring.

17. In a cultivator, a frame, a rack pivoted upon the frame, a spring for urging the rack to move in one direction, means for limiting the movement of the rack in said direction, a shovel gang swingably mounted on the frame, lifting mechanism for the shovel gang including a hand operated lever provided with a pawl for locking engagement with the rack so that when the pawl is engaged with the rack and the lifting mechanism is locked the shovel gang may be permitted to rise against the force of the spring and turn the rack upon its pivot, the spring normally holding the shovel gang in the ground but expanding when said gang strikes an obstruction.

18. In a cultivator, a frame, a rack pivoted upon the frame, a spring for urging the rack to move in one direction, means for limiting the movement of the rack in said direction, a shovel gang swingably mounted on the frame, lifting mechanism connected with the shovel gang, and comprising a pair of links connected at spaced points to the shovel gang, and a gang-operated lever connected with the links and having a pawl for engagement with the rack, whereby the tension of the spring serves to hold the shovel gang with its shovels into the ground and yet will permit the upward movement of the shovel gang against the resistance of the spring.

19. In a cultivator, a frame, a plurality of shovel gangs mounted on the frame, means for adjusting the height of the gangs, means for adjusting the lateral space between the gangs, means for holding the gangs substantially horizontal and parallel to the longitudinal axis of the cultivator whatever the adjusted position of the gangs, and yieldable means for holding the gangs in working position whereby the gangs will rise over an obstruction.

20. In a cultivator, a frame, a cross rod mounted on the frame, a shovel gang vertically swingable upon the cross rod, a bell crank lever pivoted upon the frame, a pair of links connecting the short arm of said lever with the gang at spaced points, a rack pivoted upon the frame, said lever engaging with said rack to hold the gang in adjusted vertical position, and a spring connected with said rack and resisting any tendency on the part of the gang from rising above its adjusted position, and also holding the shovels of said gang to their work.

21. In a cultivator, a frame, a cross rod mounted on the frame, a shovel gang vertically swingable upon the cross rod, a bell crank lever pivoted upon the frame, a pair of links connecting the short arm of said lever with the gang of spaced points, a rack pivoted upon the frame, said lever engaging with said racks to hold the gangs in adjusted vertical position, and a spring connected with said rack and resisting any tendency on the part of the gang from rising above its adjusted position, and also holding the shovels of said gang to their work, one of said links being hinged, and means for shifting the gang laterally on the cross rod, whereby the gang may be adjusted vertically whatever its lateral adjustment may be.

22. In a cultivator, a frame, a cross rod mounted on the frame, a shovel gang vertically swingable upon the cross rod, a bell crank lever pivoted upon the frame, a pair of links connecting the short arm of said lever with the gang at spaced points, a rack pivoted upon the frame, said lever engaging with said racks to hold the gangs in adjusted vertical position, and a spring connected with said rack and resisting any tendency on the part of the gang from rising above its adjusted position, and also holding the shovels of said gang to their work, one of said links being hinged, and the other link being pivotally connected to the gang beam by means adjustable therealong, and means for shifting the gang laterally on the cross rod, whereby the gang may be adjusted vertically whatever its lateral adjustment may be.

In testimony that I claim the foregoing as my own, I have hereto affixed my signature in the presence of two witnesses.

HENRY A. MAYER.

Witnesses:
  A. G. KRAEGE,
  F. KRAEGE.